United States Patent
Rixon

(12) 
(10) Patent No.: US 6,612,200 B1
(45) Date of Patent: Sep. 2, 2003

(54) POP OUT BRAKE PEDAL

(75) Inventor: Christopher Rixon, Tecumseh (CA)

(73) Assignee: Teleflex Incorporated, Plymouth Meeting, PA (US)

( * ) Notice: Subject to any disclaimer, the term of this patent is extended or adjusted under 35 U.S.C. 154(b) by 138 days.

(21) Appl. No.: 09/602,532

(22) Filed: Jun. 23, 2000

(51) Int. Cl.[7] .......................... G05G 1/14; F16C 11/06; F16D 1/12; F16J 1/16
(52) U.S. Cl. .......................... 74/560; 74/512; 74/562.5; 74/513; 403/151; 403/153; 403/154
(58) Field of Search ...................... 74/512, 560, 579 R, 74/579 E; 384/428; 403/151, 153, 154, 166

(56) References Cited

U.S. PATENT DOCUMENTS

| | | | |
|---|---|---|---|
| 3,451,288 A | 6/1969 | Barton et al. .................. | 74/512 |
| 3,774,471 A * | 11/1973 | Pezza .......................... | 74/560 |
| 4,018,104 A | 4/1977 | Bland et al. .................. | 74/533 |
| 4,637,741 A * | 1/1987 | Gillet .......................... | 384/428 |
| 4,779,713 A * | 10/1988 | Tomala et al. ............. | 192/88 A |
| 4,942,949 A | 7/1990 | Dai ............................ | 192/1.32 |
| 5,386,600 A * | 2/1995 | Gilbert ........................ | 4/677 |
| 5,398,569 A | 3/1995 | Carr ............................ | 74/560 |
| 5,551,317 A | 9/1996 | Gautier et al. ............... | 74/560 |
| 5,588,338 A * | 12/1996 | Carr et al. ................... | 74/560 |
| 5,685,200 A | 11/1997 | Baumann .................... | 74/512 |
| 5,690,000 A * | 11/1997 | Terrel ......................... | 74/560 |
| 5,868,039 A | 2/1999 | Baumann .................... | 74/512 |

* cited by examiner

Primary Examiner—Vinh T. Luong
(74) Attorney, Agent, or Firm—Howard & Howard

(57) ABSTRACT

A pedal assembly 10 for use in a vehicle 11 includes a pedal arm 100 that moves in a normal operating range between a rest position and an applied position under a normal operating load. The pedal arm 100 moves in a plane about an axis of rotation. The pedal assembly 10 includes a mechanism 102 for releasing the pedal arm 100 from its support 16 in response to a predetermined force applied to the pedal arm 100.

9 Claims, 2 Drawing Sheets

POP OUT BRAKE PEDAL

BACKGROUND OF THE INVENTION

1. Field of the Invention

This invention relates to vehicle pedal assemblies of the type for controlling the brakes, clutch, and throttle.

2. Description of the Prior Art

Traditional vehicle pedal assemblies may cause injuries to the lower extremities of a driver of a vehicle during a collision. To avoid or mitigate these injuries, pedal assemblies have been developed which break away during excessive loading to absorb the high forces that are generated by the driver hitting the pedal assembly. One such device is disclosed in U.S. Pat. No. 5,685,200 to Baumann issued Nov. 11, 1997. The Baumann patent discloses a brake pressure rod that transmits the brake pedal motion to the master cylinder. Under excessive loading, the rod buckles and permits the brake pedal to be pushed out of the way. However, the rod is destroyed and must be replaced.

SUMMARY OF THE INVENTION AND ADVANTAGES

The invention provides a pedal assembly having a pedal arm movable in a normal operating range between a rest position and an applied position under a normal operating load. The pedal arm is supported on a vehicle structure, specifically a bracket, for movement in a plane about an axis of rotation. The pedal assembly is characterized by a mechanism for releasing the pedal arm from the support in response to a predetermined force applied to the pedal arm.

Accordingly, the present invention provides a releasing pedal assembly that releases in response to a predetermined force, absorbing and mitigating high injury causing loads, when a driver is thrust into the pedal assembly during a vehicle collision. The invention accomplishes this through non-destructive means so that the pedal assembly will not have to be replaced after a collision has occurred.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
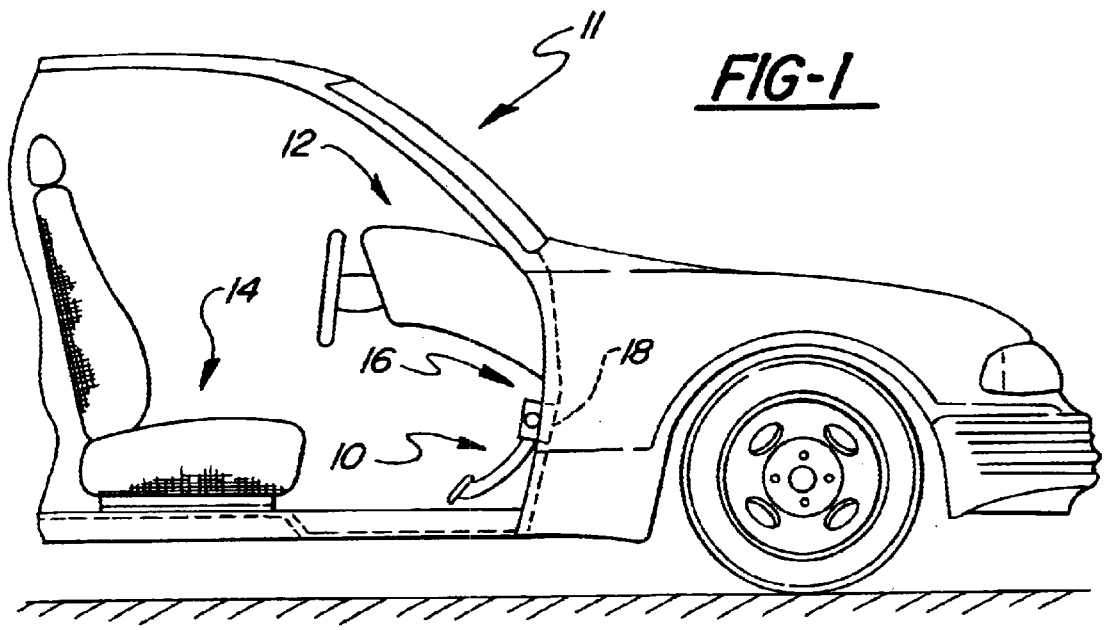
FIG. 1 is a partial view of an interior of a vehicle.

Referring to the Figures, wherein like numerals indicate like or corresponding parts throughout the several views, a releasing pedal assembly is generally shown at 10 in FIG. 1 in a vehicle 11. Although a brake pedal is shown, the present invention may be used for any pedal assembly in a vehicle, such as a clutch or accelerator pedal assembly. The pedal assemblies are situated beneath an instrument panel 12 and project toward a driver's seat 14. Often in vehicle collisions, the driver is thrust from the seat forcing the driver's legs violently toward the pedal assembly thereby injuring the driver. A support or bracket 16 for supporting the pedal assembly 10 is attached to a firewall 18 or other suitable structure.

Figure 2:
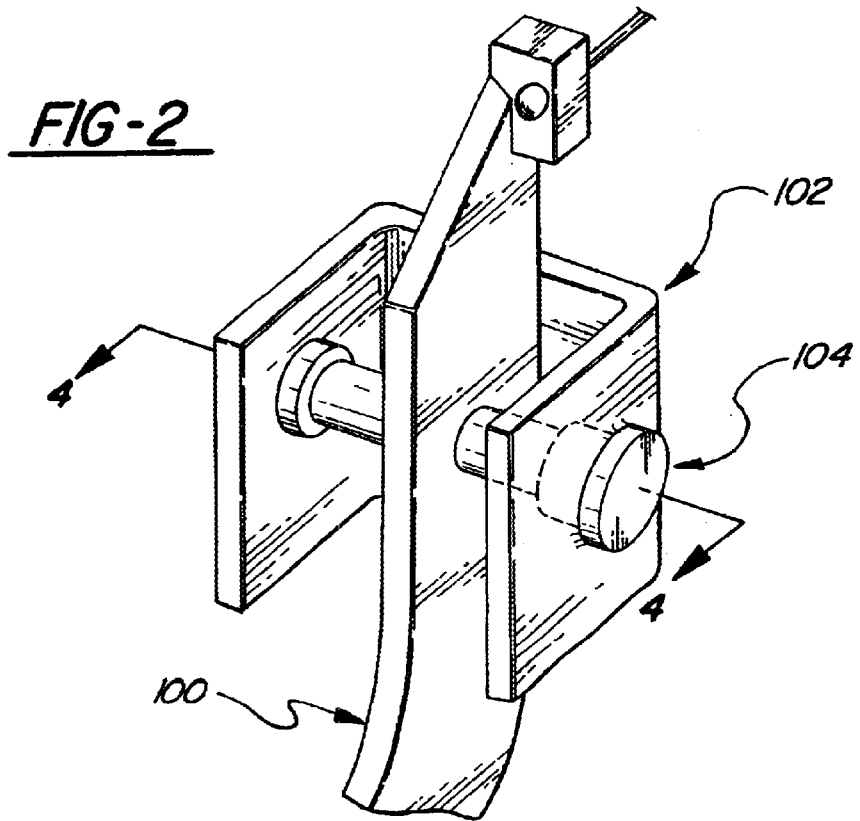
FIG. 2 is a view of an embodiment of the present invention.
Figure 3:
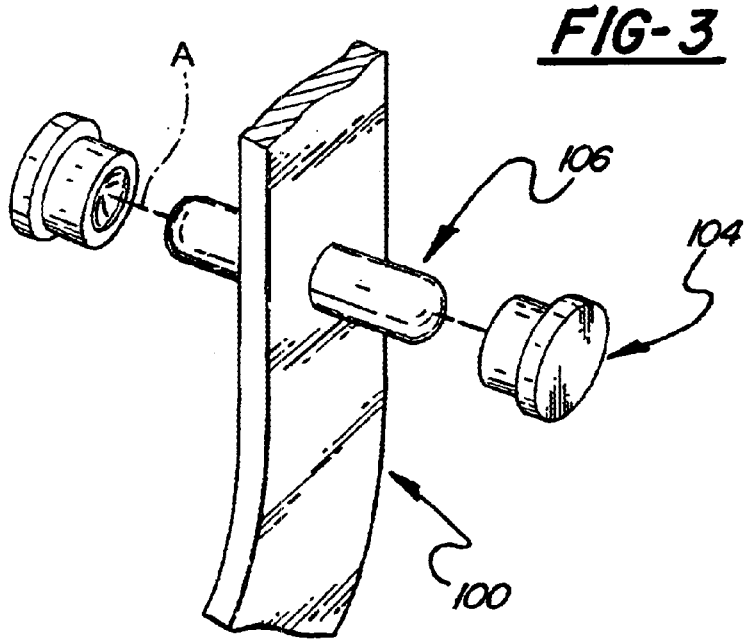
FIG. 3 is an exploded view of an embodiment of the present invention.

Referring to FIGS. 1 and 2, the invention provides a pedal assembly 10 for use in a vehicle 11 comprising a pedal arm 100 that moves in a normal operating range between a rest position and an applied position under a normal operating load and includes a mechanism for releasing the pedal arm 100 from the bracket 16. The pedal arm 100 moves in a plane about an axis of rotation (A) (as shown in FIG. 3). The pedal assembly 10 includes a mechanism 102 for releasing the pedal arm 100 from the support 16 in response to a predetermined force applied to the pedal arm 100.

Referring to FIGS. 2 and 3, the pedal assembly may include a rotational connection, such as bushings 104, to allow rotation of the pedal arm 100 about an axis (A) of rotation. These bushings 104 are mounted in the support or bracket 16 and connected to the pedal arm 100.

In addition, referring to FIG. 3, the rotational connection may include a first member, such as a pin 106, that may move parallel to the axis (A) of rotation in response to a predetermined force applied to the pedal arm 100. The first member 106 may extend from or through the pedal arm 100.

Figure 4:
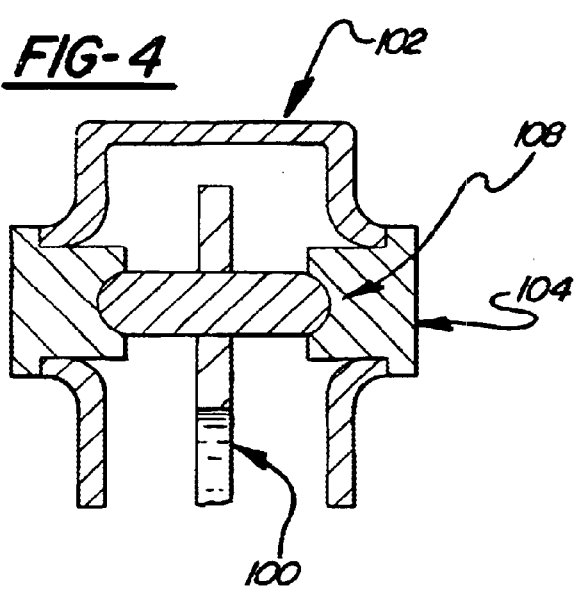
FIG. 4 is a top view of an embodiment of the present invention.

As shown in FIGS. 3 and 4, an inclined surface 108, on the rotational connection 104 or on the first member 106, may be included to facilitate the release of the pedal arm 100 from the support 102. The inclined surface 108 may be hemispherical or rounded in shape.

Figure 5:
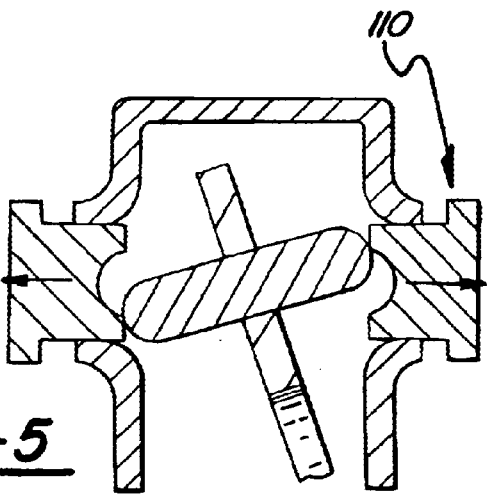
FIG. 5 is a top view of an embodiment of the present invention showing the release of the pedal arm.

As seen in FIGS. 4 and 5, the rotational connection or bushings 104 may comprise a second member 110 supported by the support 102 that moves axially in response to a predetermined force. These bushings 104 may be fitted into the support or bracket 102 and will move out of their seating in the support 102. The bushings 104 may be made of sintered metal and be press fit into the support 102, resulting in a "pop out" of the bushings 104 from the support 102 upon application of a predetermined force to the brake arm 100.

Obviously, many modifications and variations of the present invention are possible in light of the above teachings. The invention may be practiced otherwise than as specifically described within the scope of the appended claims.

What is claimed is:

1. A pedal assembly for use in a vehicle comprising:

a support;

a pedal arm;

a mechanism rotationally supporting said pedal arm on said support for movement in a plane about an axis of rotation and for releasing said pedal arm from rotational support by said support in response to a predetermined force applied to said pedal arm said mechanism includes first and second members having an inclined surface therebetween for moving one of said members relative to the other along said axis of rotation in response to said predetermined force.

2. A pedal assembly according to claim 1 wherein said first member comprises a pin.

3. A pedal assembly according to claim 2 wherein said pin includes said inclined surface.

4. A pedal assembly according to claim 3 wherein said pin extends from said pedal arm.

5. A pedal assembly according to claim 4 wherein said second member is supported by said support and rotatably supports said pin.

6. A pedal assembly for use in a vehicle comprising:

a support;

a pedal arm;

a mechanism rotationally supporting said pedal-arm on said support for movement in a plane about an axis of rotation and for releasing said pedal arm from rotational support by said support in response to a predetermined force applied to said pedal arm said mechanism includes first and second members having an inclined surface therebetween for moving one of said members relative to the other along said axis of rotation in response to said predetermined force, said inclined surface being defined as a hemisphere.

7. A pedal assembly according to claim 6 wherein said second member is supported by said support for movement axially in response to said predetermined force.

8. A pedal assembly according to claim 7 wherein said second member comprises a, bushing fitted into said support for movement axially in response to said predetermined force.

9. A pedal assembly according to claim 8 wherein said bushing is made of sintered metal.

* * * * *